United States Patent Office 3,197,331
Patented July 27, 1965

3,197,331
RESINOUS COATING COMPOSITION AND
METHODS OF APPLYING SAME
Charles L. Rohn, Somerville, N.J., assignor to Johns-Manville Corporation, New York, N.Y., a corporation of New York
No Drawing. Filed Apr. 26, 1962, Ser. No. 190,214
10 Claims. (Cl. 117—123)

This invention relates to an improved resinous coating composition and especially to such a composition for effecting adhering protective resin films or coverings, methods of applying the same, and coated products thereof. More particularly, this invention comprises improved compositions of and methods of applying polymerizable diallyl phthalate resin protective coating films.

The application or formation of coating films or coverings of assorted materials such as resins as a means of protecting the underlying article has long been a common practice, and a number of resinous coating compositions have been developed and proposed in the art for such applications. Moreover, of the numerous resin compositions or preparations known to the art there are many which are outstanding in fulfilling or realizing some singular requirement or desired characteristic but few, if any, exhibit properties which effectively fulfill or meet substantially all principal needs or requisites in coating applications including facility and efficiency in application, and continuity and durability of the applied coating. For example, many resinous products or compositions exhibiting good resistance to wear and/or corrosive materials are often deficient in their ability to form continuous uniform films when applied as solvent cut solutions or dispersions, or produce coating films which lack satisfactory dimentional stability and are susceptible to shrinking, cracking, blistering and wrinkling upon solvent evaporation and/or curing rendering it necessary to apply the same as an overlay, viz., a cured and in turn preshrunk, relatively thick sheet or layer of the resin which is superimposed upon and bonded or laminated with an adhesive to the surface of the article to be coated. Such a practice is, of course, confined to the application of coatings to surfaces or faces of articles comprising relatively flat and continuous planes or areas, and rigid precured overlay sheets or slabs do not readily conform to or provide over-all and uniform contact with rough, irregular or undulating, open surfaces as is characteristic of many materials such as hydraulic cement products enabling continuous or uniform contact and in turn adherence between the overlay coating and adjoining conterminous surface. Also the normal tendency of such precured overlays to excessive dimensional changes or shrinkage upon thermally bonding or other exposure to varying temperature conditions requires the application of an oversized sheet with subsequent trimming and the inherent expense of labor and waste material.

On the other hand, many resin compositions or preparations which are effectively adaptable to solution application and subsequent curing produce coatings which lack durability and resistance to aggressive agents, or among other potential drawbacks the solvent medium of the resin solution may exert a deleterious effect on the basic material or article.

It is a primary object of this invention to provide a new coating preparation or composition comprising a flowable blend of copolymerizable resinous materials which may be effectively and readily applied as a liquid by any suitable or convenient and economical known means such as conventional spraying, dipping, brushing, rolling, etc. techniques and which upon polymerization cures to form tenaciously adhering and conforming, fluid impervious films or coverings of outstanding resistance to aggressive chemicals and attack by most common chemicals and household agents, including acids, alkalies, organic solvents, etc.

It is also a primary object of this invention to provide liquid polymerizable resinous compositions or preparations, and application techniques therefor, which possess sufficient fluidity to enable the use of effective and economical application means or techniques with the resultant formation of uniform and continuous, conforming and adhering films and which maintain their fluid or plastic property to a degree which permits the removal of the solvent without blistering, wrinkling, cracking or crazing, or significant dimentional changes in the applied coating film and which cures to a uniform, impervious coating securely adhered to the underlying surface.

A further object of this invention is to provide improved economical and effective means of applying and tenaciously adhering protective resin coatings to asbestos-cement and the like calcareous bodies or articles which is blister-free, dimentionally stable and abrasive resistant, providing an impermeable barrier to fluids which effectively resists staining, marring, and chemical attack.

A further object of this invention to provide convenient and practical means of forming such fluid impervious, protective diallyl phthalate resin based coatings upon the surfaces or faces of asbestos-cement and the like articles or products of any given configuration or shape, and the fluid impervious, stain resistant and durable coated articles or products thereof.

A still further object of this invention is to provide polymerizable liquid resin coating or varnish compositions which can be applied by means of convenient and economical fluid application techniques such as dipping or spraying, etc., wherein the solvent component or material is such that it will not attack or deleteriously act upon uncured or cured resinous materials upon, within or comprising the base article, and which do not contain any materials which are detrimental to or assert a poisonous effect upon peroxide catalysts.

Also an object of this invention is to provide fluid coating compositions which readily form impervious, air excluding films and may be applied to materials or articles comprising uncured resins such as pre-preg papers, molding compositions, etc. without deleterious effects thereto.

These and other objects and advantages of this invention will become more apparent and fully understood from the hereinafter detailed description.

It has been found that a blend of powdered, solid diallyl phthalate and/or diallyl isophthalate prepolymer resin(s) combined with copolymerizable liquid vinyl monomer in the relatively high ratios given hereafter produce a coating composition or product having or producing the foregoing stated characteristics, among others. Suitable and effective liquid vinyl monomers which are copolymerizable with the solid powdered diallyl phthalate monomer and effective in the practice of this invention comprise diallyl phthalate including its isomer diallyl isophthalate and mixtures thereof, diallyl maleate, methyl methacrylate, acrylonitrile, vinyl chloride, vinylidene chloride, diallyl chlorendate, and styrene, and combinations of the same.

The resin prepolymer comprises partially polymerized diallyl phthalate and/or diallyl isophthalate solids in particulate powdered form having, respectively, a specific gravity of about 1.259 and 1.256, iodine no. of 55 and 64 and softening range of 80° to 105° C. and 55° to 95° C. The preferred monomer, diallyl phthalate, has a molecular weight of 246.35, a density at 25° C. of 1.12 grams per ml., a viscosity at 25° C. of 12 centipoises, and a boiling range at 4 mm. of 157° to 165° C.

Appropriate and effective ratios of the copolymerizable combinations of constituents which result in preparations providing the advantages of this invention comprises approximately 40 parts to 70 parts by weight of the solid diallyl phthalate prepolymer and at least approximately 30 parts up to 60 parts by weight of liquid vinyl monomer with the optimum ratios being about 1 part by weight of the diallyl phthalate prepolymer to about 0.75 parts to 1 part by weight of liquid monomer, depending, of course, upon the requirements of the particular application.

To the foregoing combination of prepolymer(s) and monomer(s), in accordance with usual practices and requirements, an appropriate catalyst material comprising a peroxide free radical catalyst such as tertiary butyl hydroperoxide, tertiary butyl perbenzoate, and ammonia persulfate is included in amounts of about 0.10 part to 6 parts by weight, and normally about 1 or 2 parts by weight.

The catalyst containing blend of solid prepolymer and liquid monomer comprising the polymerizable resinous coating preparation is preferably dispersed and/or dissolved within a solvent medium to facilitate handling and application. Effective solvents include for example, but are not limited to, ketone solvents such as acetone, methylethyl ketone, methylethylisobutyl ketone, methylisobutyl ketone, toluene, and the like. The proportions of resinous materials and catalyst to solvent may range as high as up to about 20 parts by weight of solvent per part by weight of the prepolymer, monomer and catalyst, depending upon the conditions and requirements of the process and products being coated. Typical and preferred proportions of resinous materials and solvent enabling adequate fluidity for optimum conditions and most applications or techniques comprise about 4 parts of solvent per part by weight of resin, but in some more stringent applications wherein the solvent may act upon the base materials less than about 0.25 part of solvent per part by weight of the resins will suffice providing ample fluidity for effective application by conventional techniques.

It is of particular significance and an essential feature of this invention that the given combination of solid prepolymer and high proportion of liquid monomer provide coating preparations or materials having consistencies or fluid characteristics providing for effective application by any suitable conventional means such as spraying, brushing, rolling, and the like, with the formation of continuous blister-free, adhered and conforming protective coatings or films. Also, of special significance is the function of the high concentration of the fluid monomer constituent which imparts and retains a high degree of plasticity or elasticity within the coating or film until all solvent has been eliminated and in turn maintains the unblemished condition thereof through formation of the cured ultimate product.

The durability and/or abrasion resistance of the diallyl phthalate resin coating films of this invention can be markedly enhanced or improved with the inclusion of effective proportions of relatively hard, finely divided particulate filler materials which are not reactive with or inert to their surrounding resin matrices and/or organic agents. Among materials providing effective fillers are powdered glass, glass beads, infusorial earth, mica, slate, pumice, china clay, gypsum, etc. Organic agents which increase hardness of the resin film include diisocyanates, aliphatic polyisocyanates, alkyl nitrites, and phthaloyl chlorides. Such particulate fillers may be incorporated in finely divided form in the coating solution or suspension and in turn ultimately in the resin coating or film in amounts up to about 50%, based on the weight of the non-solvent components of the solution or suspension, i.e., the resinous materials and catalyst of the coating film. More suitably, the filler content ranges from about 10% up to 40 or 50% on the same weight basis and preferably about 20% on the same weight basis is appropriate for most typical applications. Also, by utilizing a filler material having a refractive index matching that of the diallyl phthalate resin coating, a clear film can be obtained, or by selecting colored filler material it can also serve as a pigment imparting color to the film.

The coating preparations or materials of this invention comprise effective protective coatings for a wide variety of base materials or articles and are uniquely adapted to certain heretofore relatively difficile applications such as coating highly porous and/or strongly alkali calcareous materials comprising common asbestos-cement articles, thus providing means of producing new and highly desirable products therefrom.

Asbestos-cement or the like calcareous materials and products composed thereof, for example, as normally produced are relatively porous and in turn highly susceptible to staining and/or penetration by fluids, etc. This characteristic presents a serious handicap in the utilization of such materials in products for domestic and commercial furniture and appointments such as tops or the like surface components for tables, counters, window sills, desks, and work or laboratory bench tops, etc. A means of overcoming the porous nature and the disadvantages inherent therein proposed heretofore is the laminating or pressing and bonding of a slab or sheet resin overlay with the asbestos-cement or the like calcareous body much in the same manner as in the production of high pressure resin laminates commonly utilized in household kitchen and bathroom furniture and counter tops. However, preformed resin overlays or sheets as pointed out before, can be effectively applied substantially only to flat surfaces and they do not readily conform to or provide good contact with the normally rough and open surfaces of asbestos-cement compositions whereby a uniform bond is attainable.

Illustrations of these applications and the advantages thereof will be more fully set forth and demonstrated by the hereinafter specific examples.

The following examples in which all proportions are by weight are given to illustrate the coating preparations or compositions, methods of applying the same, and improved coated products of this invention.

EXAMPLE I

A 40% solution comprising the following dissolved in the solvent:

| | Parts by weight |
|---|---|
| Diallyl phthalate prepolymer solids | 20 |
| Diallyl phthalate liquid monomer | 20 |
| T-butyl perbenzoate catalyst | 0.8 |
| Acetone solvent | 60 | was applied to cured asbestos-cement slabs, the acetone solvent evaporated, and the resulting resin coating film cured by subjecting the coated slabs to a temperature of about 350° F. for a period of 6 hours. The cured coating uniform and continuous, and exhibited excellent resistance to chemicals, heat, and ultraviolet light.

EXAMPLE II

A solvent dispersed 20% solution comprising the following:

| | Parts by weight |
|---|---|
| Diallyl phthalate prepolymer solids | 9.8 |
| Diallyl phthalate liquid monomer | 9.8 |
| T-butyl perbenzoate catalyst | 0.4 |
| Acetone solvent | 80.0 | was sprayed on asbestos-cement slabs, the spray coated slabs were heated to and maintained a temperature of 180° F. for 6 hours whereupon the temperature was gradually increased to 350° F. over the next 12 hours and retained there for a final period of 6 hours. The 20% solids concentration coating solution was readily sprayable and cured to a uniform blister-free film of excellent stain and chemical resistance.

Cured samples of diallyl phthalate resin coated asbestos-cement sheets of the foregoing examples were tested for resistance to staining and aggressive materials by means of a spot test method. This test consisted of placing a spot of approximately 7 drops of the various agents given in the following table upon the resin coating film formed on asbestos-cement board, permitting the spot to remain on the sheet for 24 hours, and then washing it off with water. In the cases where wax or nail polish were applied, the excess was removed with a spatula before washing with water. The samples were then checked to see if any stains remained. Typical agents applied in this test consisted of items normally found in the home, office, or laboratory. The results of the spot test are given in the following table and, as is fully apparent, the coating film applied provided excellent resistance to most of the materials.

*Table*

RESULTS OF SPOT TEST

| Staining Agents | Rating | Staining Agents | Rating |
|---|---|---|---|
| 1. Butter | 0 | 22. Lipstick | 0 |
| 2. Deep fat | 0 | 23. Beet juice | 0 |
| 3. Merthiolate | 0 | 24. Vegetable dye | 0 |
| 4. Iodine | 0 | 25. Red candle grease | 0 |
| 5. Merchurochrome | 0 | 26. Lighted cigarette | S-1 |
| 6. Ink | 0 | 27. Nail polish | 0 |
| 7. Stamping ink | 0 | 28. Nail polish remover | 0 |
| 8. Pencil | 0 | 29. Carbon tetrachloride | 0 |
| 9. China marker | 0 | 30. Bon ami | 0 |
| 10. Crayon | 0 | 31. Hand lotion | 0 |
| 11. Coffee | 0 | 32. Machine oil | 0 |
| 12. Mayonnaise | 0 | 33. Shoe polish | 0 |
| 13. Karo | 0 | 34. Scratch remover | 0 |
| 14. Lemon juice | 0 | 35. Scotch tape | 0 |
| 15. Gravy | 0 | 36. Milk | 0 |
| 16. Metal—wet | 0 | 37. Lighter fuel | 0 |
| 17. Tomato juice | 0 | 38. Perfume | 0 |
| 18. Ammonia | 0 | 39. Vinegar | 0 |
| 19. Sodium hydroxide | S-1 | 40. Tincture benzoin | S-½ |
| 20. Clorox | 0 | 41. Mustard | 0 |
| 21. Aerosol OT | 0 | | |

0—No stain.
S-½—Stain visible only under certain lighting conditions.
S-1—Stain barely visible under crosslight.

EXAMPLE III

The solution formulation given in Example I was prepared with the addition of finely ground glass filler in amount of about 20% by weight of the total resinous or non-solvent constituents and spray applied to asbestos-cement slabs and cured as in Example I, viz., upon solvent evaporation exposure to temperature of approximately 350° F. for a period of 6 hours. The abrasion resistance of the glass-filled coating film and of a standard well known high pressure laminate consisting of layers of phenolic impregnated paper covered by a decorative imprinted sheet with a clear overlay of melamine saturated paper, were compared as follows:

Physical Properties

| Properties | Diallyl Phthalate Coated Asbestos-Cement Sheet | Standard Laminate Product |
|---|---|---|
| Resistance to Heat °F (Continuous). | 400–450 | 400. |
| Abrasion Resistance av. wt. loss. | .040 gm./50 cycles | .050 gm./50 cycles. |
| Slipperiness to Paper | Paper holds to surface when written on. | Paper slides across surface when written on. |
| Effect of Sunlight | None | Slight. |

The abrasion resistance was measured with a Taber Abrasion Test run in accordance with NEMA Standards LPZ–Z.01 which comprised surfacing the Taber abraser wheels with NEMA S–33 sandpaper strips and a 1000 gm. load, and determining the weight loss for each 50 cycles.

Among others, a further specific, unique, and advantageous application of the coating preparations or compositions of this invention, and products thereof, is the formation or application of encapsulating, protective varnishes for papers or fibrous materials and the like which have been "pre-pregged" by impregnating or saturating with uncured resin impregnant such as frequently employed as or in conjunction with electrical and thermal insulations, molding compositions, etc. For instance, asbestos, glass, or the like woven or non-woven tapes or sheets saturated or "pre-pregged" with uncured dielectric resin preparations are commonly employed as electrical insulations in and about devices such as motor windings, etc., by applying "pre-pregged" paper or tape thereto embodying or saturated with uncured resin, and then curing the resin impregnant in situ. Uncured resin "pre-pregs" or saturants such as polyester resins are air inhibited and must be protected from oxygen-containing atmospheres or conditions to effectively cure the same. To prevent the deleterious effects of oxygen varnish coatings have been proposed but the high solvent content required for handling and applying typical varnish resin coatings for protective encasement, their possible containment of constituents poisonous to peroxide catalysts, or lack of uncured storage or shelf life when catalyzed, among other potential hazards, has prohibited the use of many otherwise apparently appropriate resinous varnishes.

Unlike conventional diallyl phthalate or other resin coating or varnish compositions, the coating preparations or materials of this invention comprise blends of solid powdered diallyl phthalate prepolymer with high proportions of liquid monomer providing sufficient fluidity with little or substantially insignificant amounts of solvent, i.e., proportions of only up to about 0.25 part by weight of solvent per part of solid resin prepolymer and liquid monomer and catalyst, to enable ease of application with common brushing, dipping, or spraying techniques and the effective formation of uniform air impermeable, encasing films or membranes. Further, these coating preparations or materials contain no constituents noxious to peroxide or the like catalyst, have storage or shelf life of greater than one month even when catalyzed, and cure as fast or faster than polyester resins at temperatures of approximately 300° and 380° F. Thus, articles can be wrapped and enclosed or shaped objects, e.g., tubes, etc. can be formed or fabricated with paper saturated with an uncured polyester or the like resin for electrical applications and the wrapped article or object encased within an air excluding varnish film, air dried and cured, without air inhibition impeding or effecting the cure of the polyester resin.

The following example comprises a suitable varnish formulation for encasement of solvent and catalyst sensitive, polyester saturated asbestos paper products such as electrical insulating tape.

EXAMPLE IV

A coating solution or dispersion was produced by admixing the following:

| | Parts by weight |
|---|---|
| Diallylisophthalate prepolymer | 44 |
| Diallyl phthalate liquid monomer | 33 |
| Methylethyl ketone solvent | 22 |
| Tertiary butyl perbenzoate catalyst | 1 |

Asbestos paper containing about 45% by weight of uncured polyester resin was dipped in varnish of the above formulation, and upon removal of the excess varnish was wrapped about an armature coil and cured in place without pressures or restraining means by air drying 15 minutes and then baking at 300° to 380° F. for approximately one hour. The technique resulted in a well bonded and integrated resin and asbestos paper wrapping or dielectric sheet completely enclosing the coil.

It will be understood that the details given are for the purpose of illustration, not restriction, and that variations from the spirit of this invention are intended to be included within the scope of the claims.

What I claim is:

1. The method of applying dimensionally stable, continuous blister-free and fluid impervious, adhering diallyl phthalate resin protective surface coatings of high chemical resistance to the surface of calcareous cement materials which comprises forming a continuous conforming coating film on a face of an article of the calcareous material by applying thereto a flowable dispersion consisting essentially of a combination of 40 parts to 70 parts by weight of solid powdered diallyl phthalate prepolymers and 30 parts to 60 parts by weight of liquid vinyl monomer selected from the group consisting of diallyl phthalate, diallyl maleate, methyl methacrylate, acrylonitrile, vinyl chloride, vinylidene chloride, diallyl chorendate, and styrene, and mixtures thereof, together with about 0.10 part to 6 parts by weight of a peroxide free-radical catalyst dispersed in a solvent medium in amount up to approximately 20 parts by weight of solvent per part by weight of the resinous prepolymer and monomer and catalyst, evaporating the solvent and curing the resinous prepolymer and monomer by subjecting the coating film to a temperature of approximately 250° F. to 450° F. to provide an adhering continuous and conforming surface coating film rendering the porous surface of the calcareous cement material impervious to fluids and resistant to staining.

2. The method of claim 1 wherein the dispersion and in turn the resulting protective coating embodies particulate filler material in amount up to approximately 50% by weight of the resin.

3. The method of applying dimensionally stable continuous blister-free and fluid impervious, adhering diallyl phthalate resin protective surface coatings of high chemical resistance to asbestos-cement products which comprises forming a continuous conforming coating film on a face of an asbestos cement product by applying thereto a flowable dispersion consisting essentially of the combination of 40 parts to 70 parts by weight of solid powdered diallyl phthalate prepolymer and 30 parts to 60 parts by weight of liquid vinyl monomer selected from the group consisting of diallyl phthalate, diallyl maleate, methyl methacrylate, acrylonitrile, vinyl chloride, vinylidene chloride, diallyl chlorendate, and styrene, and mixtures thereof, together with about 0.1 part to 6 parts by weight of a peroxide free-radical catalyst selected from the group consisting of t-butyl perbenzoate, benzoyl peroxide, di-tertiary butyl peroxide, tertiary butyl hydroperoxide, and ammonia persulfate, and mixtures thereof, dispersed in a ketone solvent medium in amount up to approximately 20 parts by weight of solvent to part by weight of resinous prepolymer and monomer and catalyst, evaporating the ketone solvent and polymerizing the prepolymer and monomer by subjecting the coated product to a temperature of approximately 250° F. to 400° F. for a period of approximately 4 hours to 24 hours varying with the temperature to provide an adhering continuous and conforming surface coating film rendering the porous surface of the asbestos-cement products impervious to fluids and resistant to staining.

4. The method of applying dimensionally stable, continuous blister-free and fluid impervious, adhering diallyl phthalate resin protective surface coatings of high chemical resistance to asbestos-cement products which comprises forming a continuous conforming coating film on a face of an asbestos-cement product by applying thereto a flowable dispersion consisting essentially of approximately equal parts by weight of solid powdered diallyl phthalate prepolymer and liquid monomer diallyl phthalate together with about 1% to 2%, by weight of said resinous prepolymer and monomer, of t-butyl perbenzoate catalyst dispersed in approximately 1 part to 4 parts by weight of an acetone solvent medium, evaporating the acetone solvent and polymerizing the prepolymer and monomer by subjecting the coated product to a temperature of approximately 250° F. to 400° F. for a period of about 4 hours to about 24 hours varying proportionately with the temperature to provide an adhering continuous and conforming surface coating film rendering the porous surface of the asbestos-cement products impervious to fluids and resistant to staining.

5. The method of claim 4 wherein the resinous dispersion and in turn the resulting protective resin coating embodies finely ground glass in amount approximately 10% to 30% by weight of the resin solids.

6. The method of claim 5 wherein polymerization of the prepolymer and monomer is effected at a temperature of approximately 350° F. for a period in excess of about 6 hours 7. A calcareous cement article provided with a continuous and conforming blister-free and fluid impervious, adhering protective resin surface coating of high chemical resistance consisting essentially of the polymerization product of a flowable solvent dispersion of 40 parts to 70 parts by weight of solid powdered diallyl phthalate prepolymer resin and 30 parts to 60 parts by weight of liquid vinyl monomer selected from the group consisting of diallyl phthalate, diallyl maleate, methyl methacrylate, acrylonitrile, vinyl chloride, diallyl chlorendate, and styrene, and mixtures thereof, together with about 0.10 part to 6 parts by weight of peroxide free-radical catalyst, said coating forming a continuous and conforming surface film rendering the porous surface of the calcareous cement article impervious to fluids and resistant to staining.

8. The calcareous article of claim 7 wherein the protective continuous and conforming surface coating contains particulate filler material in amount up to approximately 50% by weight of the resin.

9. An asbestos-cement article provided with a continuous and conforming blister-free and fluid impervious, adhering protective resin surface coating of high chemical resistance consisting essentially of the thermal polymerization product of a flowable solvent dispersion of approximately equal parts by weight of solid diallyl phthalate prepolymer resin and liquid diallyl phthalate monomer together with about 1% to 2% by weight of the resinous prepolymer and monomer of t-butyl perbenzoate catalyst, said coating forming a continuous and conforming surface film rendering the porous surface of the asbestos-cement article impervious to fluids and resistant to staining.

10. The asbestos-cement article of claim 9 wherein the protective continuous and conforming surface coating contains finely ground glass filler in amount of approximately 10% to 30% by weight of the resin.

References Cited by the Examiner

UNITED STATES PATENTS

| | | |
|---|---|---|
| 2,568,658 | 9/51 | Pope. |
| 2,595,852 | 5/52 | Hopper et al. |
| 2,792,871 | 5/57 | Doigan _____ 117—126 |
| 2,990,388 | 6/61 | Johnston et al. |
| 3,002,869 | 10/61 | Hough et al. |

OTHER REFERENCES

Burnett: Modern Plastics Encyclopedia, issue for 1962, vol. 39, September 1961, #1a, pp. 153–156.

RICHARD D. NEVIUS, *Primary Examiner.*

WILLIAM D. MARTIN, *Examiner.*